Sept. 25, 1934.   L. J. R. HOLST ET AL   1,974,423
MOTION PICTURE PROJECTOR
Filed Sept. 7, 1933   2 Sheets-Sheet 1
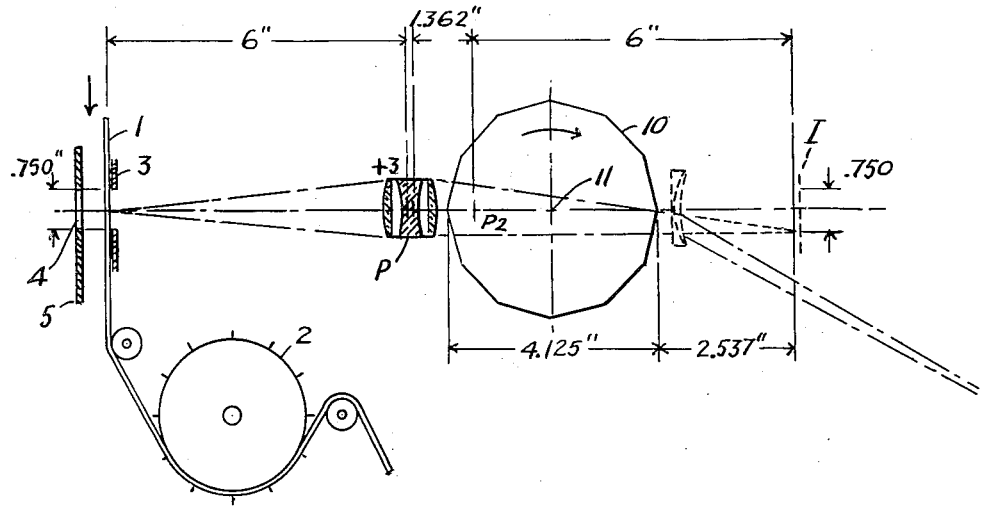
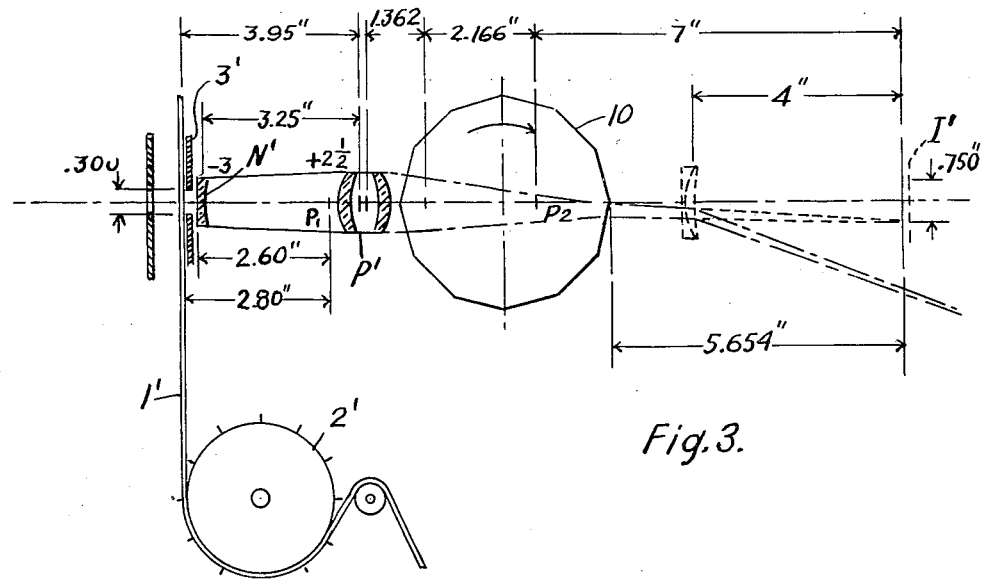
Inventors
Lodewyk J. R. Holst,
William Mayer and
Harry R. Menefee
By
Attorney

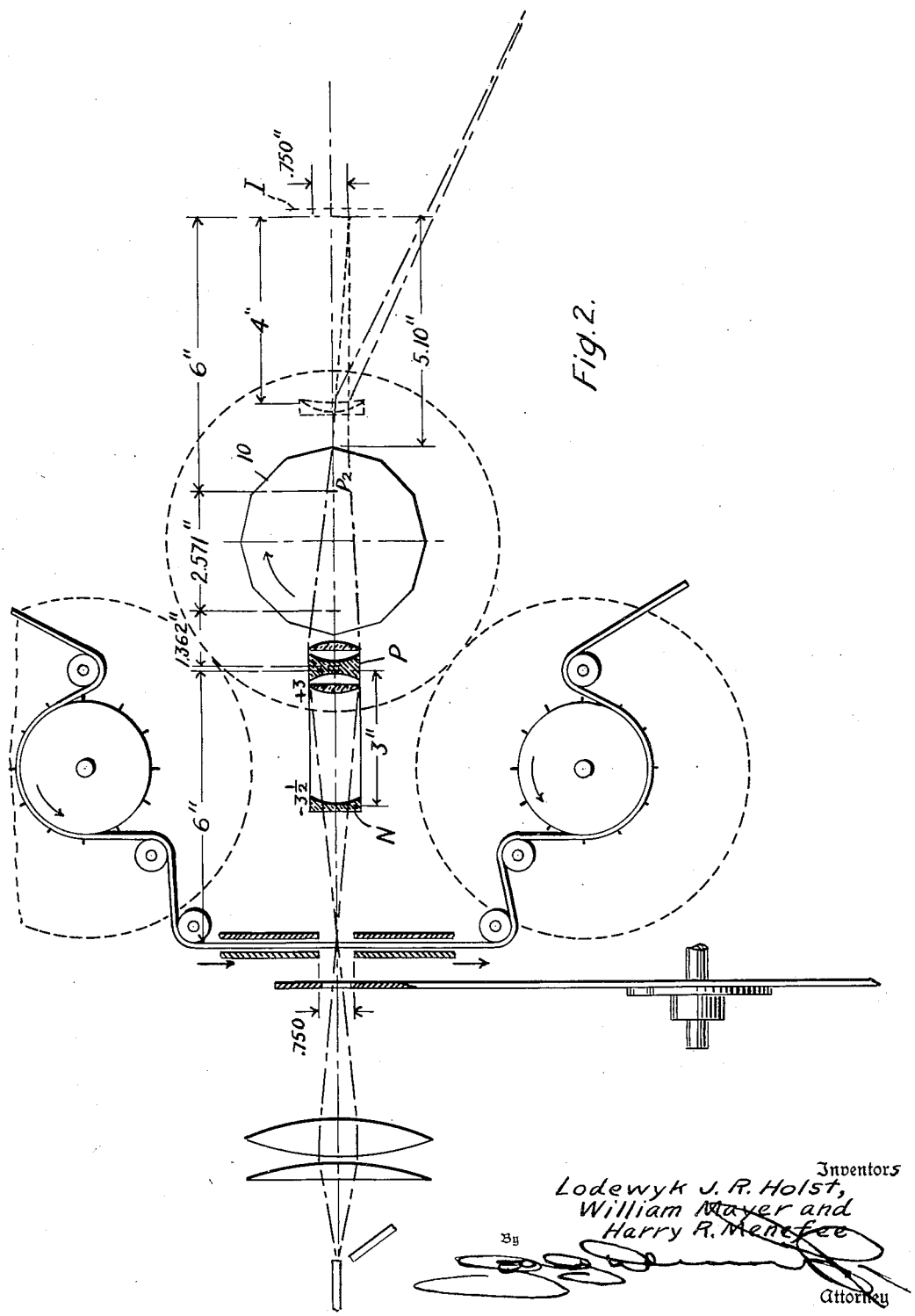

Patented Sept. 25, 1934

1,974,423

UNITED STATES PATENT OFFICE 1,974,423

MOTION PICTURE PROJECTOR

Lodewyk J. R. Holst, Brookline, Pa., and William Mayer, Larchmont, and Harry Ray Menefee, Bronxville, N. Y., assignors to The S. M. M. H. Corporation, Dover, Del., a corporation of Delaware Application September 7, 1933, Serial No. 688,424

6 Claims. (Cl. 88—16.8)

Our invention is a motion picture projector having means for forming a stationary aerial image in the object plane of a projection lens or lens system and at such distance from the mechanism which rectifies or compensates for the movement of the image strip as to permit the use of a projection lens of desired focal length and aperture and avoid the flickering which results from the movement of motion compensating mechanism close to the object plane of the projecting lens.

Our present invention is particularly applicable to the types of motion picture projectors set forth in our application Serial No. 639,192, filed October 24, 1932 and in the prior Patent No. 1,928,623, of October 3, 1933 of L. J. R. Holst, and in which image-forming rays emanating from object points on a moving image strip are converged and focused in an image plane by a lens having an object focal plane substantially coincident with the image strip and a conjugate focal plane in which such image rays are converged and focused to form image points corresponding to the object points and produce an image (preferably aerial) which is rendered stationary by the insertion in the image space of the lens of rotary plano-parallel light-refracting means having an axis crossing normally the optical axis of the lens and normal to the direction in which succeeding images follow one another. Such light-refracting means preferably consist of a regular polygonal transparent glass block having a plurality of pairs of equal parallel surfaces which move in harmony with the movement of the image strip to produce the stationary image. This stationary image is enlarged and projected upon a screen by a projecting lens or lens system which may be either positive or negative in its characteristics.

The leading object of the present invention is to adjust the distance between the plane of such stationary aerial image and the transparent block without reduction in the relative opening of the lens forming such image (whose effective diameter should not exceed the height of a surface of the polygonal block) and without decreasing the intensity of the screen illumination, and to avoid the use of a long focus positive lens in forming the stationary aerial image. These objects we obtain by inserting a negative or dispersing lens of suitable focal length in the optical axes of the projector between the film plane and the image-forming positive lens. Such dispersing lens may be so placed that it does not effect any change in the equivalent length of the combined system as compared with the focal length of the positive lens alone, and in certain cases provides an increased relative opening of the lens. The insertion of the negative lens need not change the location of the rear nodal point of the lens combination, but shifts the front nodal point further out and places the aerial image plane in the desired advance position.

The characteristic features and advantages of our improvements will further appear from the following description and the accompanying diagrams in illustration thereof.

In the accompanying drawings, Fig. 1 illustrates diagrammatically the relative positions of the parts of a projector to which our improvements are applicable; Fig. 2 illustrates diagrammatically the application of our improvements to the projector shown in Fig. 1 to advance the aerial image plane thereof without affecting the focal length of the apparatus; and Fig. 3 illustrates diagrammatically the application of our improvements to the projector shown in Fig. 1 to advance the aerial image plane thereof while at the same time effecting an enlargement of the aerial image to two and a half times the size of the film image.

As illustrated in the drawings, an image strip or film band 1 may be drawn continuously by a sprocket 2 from any suitable source of supply and across the aperture of an image gate 3. The film section in the gate aperture may be illuminated in any suitable manner, as for instance, by the passage of a beam through a spiral slot 4 in a rotary shutter 5 from an arc light and condenser lens (not shown).

A plano-parallel refracting member 10 having six pairs of equal parallel surfaces arranged to form a regular polygonal transparent block is mounted in front of the film gate and is rotatable, in synchronism with the movement of the image strip about its axis 11 crossing normally the optical axis of the projector and normal to the direction in which succeeding images follow one another on the film. Suitable means, not herein shown, are provided for rotating the block 10 so that its surfaces move in harmony with the movement of the image strip.

As shown in Figs. 1 and 2, a positive lens P, preferably having a diameter no greater than the height of one of the faces of the block 10, is mounted in the optical axis of the projector with its object focal plane substantially coincident with the image strip 1 and a conjugate focal plane on the opposite side of the block 10. Preferably, the angle of incidence of light rays converged by the lens on the surface of the block 10 nearest the lens is greatest when such surface is normal to the optical axis of the lens and gradually decreases until the edge of such surface is in the plane of such optical axis.

The image rays emanating from the object points on the image strip pass through the lens P and the block 10 to form an aerial image I in a plane coincident with the virtual image plane of a negative projection lens as described in our application Serial No. 639,192, or in the object plane of a positive lens as described in said Patent No. 1,928,623.

When the image strip 1 is of usual 35 mm. film and it is desired to produce an aerial image I of the same size, it is desirable to use a positive lens P having a positive focal length of at least 3 inches to secure adequate illumination. If the twelve-sided prism block be made of glass with a refractive index of about 1.51623 for the $d$ line, its length between parallel faces is practically 4 inches and the plate-glass effect is four times $$\frac{.51623}{1.51623}$$

or 1.362 inches.

If the focal length of the lens P is 3 inches, then the rear focal distance is 6 inches and the front focal distance is 6+1.362 or 7.362 inches. The over edge dimension of the prism is approximately 4.125 inches and about three quarters of an inch is required for satisfactory clearance between the lens P and the edges of the block. Hence, the distance from the front edge of the prism to the focal plane of the aerial image I in Fig. 1 is but 2.537 inches (viz. 7.362″−(4.125″+ .75″).

Such clearance and analogous clearances resulting from the use of converging lenses of desirable focal lengths and blocks of desirable refractive indexes are insufficient for obtaining the best screen image effects because the movement of the block edges so close to the object focal plane of either a positive or negative projection lens tends to cause flicker in the screen image. The maximum focal length of a negative projection lens which can be placed between the rotating block 10 and the aerial image plane with the virtual image plane of the negative lens coincident with such aerial image plane is only about 2.25 inches, which is insufficient to give a screen image of desired size and illumination at distances usually required.

When, however, as illustrated in Fig. 2, a negative or dispersive lens N of say 3½ inches focal length is positioned between the lens P and the film 1, the rear focal distance is not substantially changed but the front nodal point of the lens combination is shifted forward a distance of 2.571 inches, hence the aerial image plane is now 2.537 inches plus 2.571 inches or 5.108 inches in front of the prism edges. Consequently a negative projection lens up to 4.5 inches focus can be used and the edges of the block are so far removed from the object focal plane of the projection lens (either negative or positive) that the movements thereof have no effect on the screen image.

In determining the effect of the insertion of a negative lens between the film 1 and the collective lens P, the focal length of the negative lens may be designated by N and the focal length of the positive lens by P, and the equivalent focal length E of the combined system may be expressed—

$$E = \frac{P \times N}{P - N - d}$$

in which $d$ represents the distance intervening between P and N.

When the distance $d$ is made equal to the focal length P of the collective element, the formula becomes—

$$E = \frac{P \times N}{N}.$$

Since the product P, N is a negative quantity, $E=P$ and hence in such adjustment the focal length of the auxiliary lens P remains unchanged no matter which value be given to N.

The formulæ determining the locations of the first and second nodal points of the system are respectively—

$$\frac{N \times d}{P - N - d} \text{ and } \frac{P \times d}{P - N - d}$$

Hence where $d$ equals P the first nodal point displacement equals $$\frac{N \times d}{N} \text{ or } d$$

whereas the second nodal point displacement equals $$\frac{P \times d}{N} \text{ or } S.$$

From this it follows that since N is at a distance $d$ from P and the nodal point is at the distance $d$ from N, the first nodal point has suffered no change in location and remains coincident with the first nodal point of the collective element or positive lens P.

In the case of the second nodal point, the magnitude of S becomes $$\frac{P^2}{N},$$

and depends, consequently, on the relative magnitudes of P and N.

In the examples given, since lens P is of 3 inches focal length and lens N is of −3½ inches focal length the value of S equals $$\frac{9}{-3.5}$$

or −2.571 inches. Hence the front focal plane of the lens system, as above set forth, is 2.571 inches further out than it would be without the dispersive lens. The focal length is not, however, changed, and the rear focal distance of the lens combination is substantially the same with or without the negative lens, although the rear focal distance is theoretically increased by the optical thickness of the dispersing lens, viz., by the separation between its two nodal points. But as this is a very small quantity, not exceeding say .125 inches, and may be either plus or minus in direction, it is of no practical influence or effect.

The relative opening of the lens system is not reduced by the inclusion of the dispersive lens as above set forth and a well illuminated aerial image of the same size as the screen image is produced at a distance from the block suitable for its projection on the screen through either a negative or positive projection lens.

The relative values of the positive and the negative focii and the separation between the collective and the dispersive elements may be varied, without departing from our invention, to effect the production of a screen image of desired size and illumination from a film image of given size at a given screen distance without requiring a projector casing of unwieldy size. If, for instance, with a given projecting lens it is desired to produce a screen image of given size at a given screen distance from a film image of subnormal size, it is necessary that the aerial image be made larger than the film image, and the front focal length is increased in the necessary ratio to increase the size of the aerial image. To so increase the size of the aerial image by adjusting the position of the collective element when used alone will position the aerial image at an amply sufficient distance from the rotary block but without any increase in illumination to compensate for the enlargement of the image. By the utilization of our invention this objection may be overcome by inserting a lens of negative focus at such distance from the collective lens as to cause the equivalent focus of the lens system to be less than the focal length of the positive element alone, thereby increasing the effective relative opening and positioning an aerial image of the desired size in a plane at such distance from the rotating block as will permit the use of a desired projecting lens and eliminate flicker without requiring a projector of inconvenient length.

If, for instance, it is desired to form from a 16 millimeter film image an aerial image having an area equivalent to a 35 millimeter film image, then the front focal length must be three and a half times the equivalent focal length of the converging lens or lens system to secure the required 2½ to 1 ratio. If the positive lens of 3 inch focal length above referred to be used, the aerial image would be 3½ times 3 plus 1.362 or 11.862 inches, in front of the front nodal point of the positive lens. It is, therefore, undesirable to further lengthen the front focal distance but it is desirable to use lenses of shorter focal length and to utilize an increased relative opening obtainable by our system as compared with the collective lens alone.

Such an arrangement is illustrated in Fig. 3 where the sprocket 2' draws a 16 millimeter film strip past an appropriately sized aperture in the film gate 3'. To produce from a film image on a 16 millimeter film an aerial image I' the size of a 35 millimeter film image, the front focal length required will be 3½ times the focal length of the collective lens system comprising a collective lens P' and a dispersive lens N'.

If the collective lens P' have a focal length of 2½ inches and be used alone with the block 10 to produce a stationary aerial image 2½ times the size of the film image, then the plane of such aerial image would be 10.112 inches in front of the front nodal point of the positive lens. If now a negative lens N' be inserted between the film 1' and the collective lens P' it may be so positioned as to not substantially increase the distance between the aerial image plane and front nodal point of the collective lens although increasing the relative opening of the lens combination and thereby increasing the illumination.

If it be assumed that a lens combination having an equivalent focal length of 2 inches and a diameter not exceeding the height of a block facet, will give the desired illumination of the enlarged image, then the negative lens will be positioned at a distance of 3.25 inches from the rear nodal point of the lens P', for if $$P'=2.5, N'=-3 \text{ and } d=3.25$$

then $$E = \frac{2.5 \times -3}{2.5-3-3.25} = \frac{-7.5}{-3.75}$$

or 2 inches equivalent focal length for the lens combination.

The interposition of the negative lens as described and the consequent increase in the relative opening and speed of the lens combination results in an increase of the illumination on the screen of well over fifty per cent, viz., When the positive lens P' is used alone $P'=2.5''$ focus at a speed F/2.5.

The draw at which the lens works is 1.4 times the focal length,

Hence the speed of the positive lens P' alone is F/2.5×1.4 or F/3.5.

With the interposition of the lens N', the lens combination $P'+N'=2''$ equivalent focus at a speed F/2.

The draw is again 1.4 times the equivalent focus,

Hence the aperture becomes

F/2×1.4 or F/2.8. There is thus a gain in light proportional to $$\frac{3.5^2}{2.8^2}$$

or 1.56.

This gain in illumination is without any necessity for rendering the projector unduly bulky but the aerial image plane I' is positioned at a distance from the prism ample for all practical purposes for The front nodal point shifts $$\frac{P' \times d}{3.75} = \frac{2.5 \times 3.25}{3.75}$$

| | |
|---|---|
| or | 2.1666'' |
| The front focal distance is 3.5 × 2 or | 7.0000'' |
| prism effect is | 1.3620'' |
| so that the distance between positive element and aerial image plane is | 10.5286'' |
| Subtracting the prism and clearance as before | 4.875'' |
| leaves a space of | 5.6536'' |

The rear nodal point of the lens combination is shifted forward from the first nodal point of the negative lens for $$\frac{N \times d}{3.75} = \frac{3 \times 3.25}{3.75} \text{ or } 2.600''$$

which the rear nodal point is shifted.

The rear focal distance is $$\frac{7}{2.5} \text{ or } 2.800''$$

hence the film focal plane is .2 inches behind the negative element and .2''+3.25'' or 3.45'' behind the positive element.

Having described our invention, we claim:

1. In a motion picture apparatus with uniform film movement, the combination with film feeding mechanism and a rotatable plano-parallel rectifying member synchronized with the feeding mechanism and having at least two parallel surfaces, of a positive real image-forming lens system disposed between said rotatable member and the plane of the film fed by said mechanism, said lens system comprising a positive real image-forming element adjacent to the rectifying member and a negative element adjacent to the film for moving the front nodal point of the system forwardly of the nodal point of the positive element and maintaining the front focal distance of the lens system substantially the same as the front focal distance of the positive element alone.

2. In a motion picture apparatus with uniform film movement, the combination with film feeding mechanism and a rotatable plano-parallel rectifying member synchronized with the feeding mechanism and having at least two parallel surfaces, of a positive real image-forming lens system disposed between said rotatable member and the plane of the film fed by said mechanism, said lens system comprising a positive real image-forming element adjacent to the rectifying member and a negative element adjacent to the film for moving forwardly the focal point of the system in front of the focal point of the positive element and providing an effective aperture of the system that is larger than the effective aperture of said positive element.

3. In motion picture apparatus for continuous film movement, the combination with film feeding mechanism and a rotatable plano-parallel rectifying device synchronized with the movement of a film fed by said mechanism and having at least two parallel surfaces, of a negative lens unit between a film fed by said mechanism and said rectifying device and a positive real image-forming lens unit between said negative lens unit and said rectifying device, said negative lens unit and positive lens unit forming a positive image-forming lens system having an equivalent focal length represented by the formula $$E = \frac{P \times N}{P - N - d},$$

in which E is the equivalent focal length of the system, P represents the equivalent focal length of the positive lens unit, N represents the equivalent focal length of the negative lens unit and d represents the distance between the positive lens unit and the negative lens unit; said lens system having a front focal plane conjugate with the plane of said film and more remote from the positive lens unit than the equivalent focal length of the lens system.

4. In a motion picture apparatus, the combination with means for feeding a film and a rotatable plano-parallel rectifying member synchronized with the movement of a film by said feeding means and having at least two parallel surfaces, of a lens disposed between the plane of a film translated by said means and said member and comprising an element of negative focal length toward said film plane, and an element of positive focal length toward said member, said lens system having a front focal distance longer than the front focal distance of said positive element alone, and a lens of negative focal length inserted in said front focal distance and having a virtual image plane adjacent to, but slightly retracted from, the image plane of said lens system conjugate with the object plane of said lens system coincident with said film plane.

5. In a motion picture apparatus, the combination with film feeding mechanism and a rotatable plano-parallel rectifying member synchronized with the movement of film fed by said mechanism and having at least two parallel surfaces, of a lens system disposed between the plane of a film translated by said mechanism and said member, said lens system comprising a positive lens having an object focal plane substantially coincident with said film plane and a conjugate focal plane in which rays converged by said lens form image points from object points on said film, and a negative lens positioned between said film plane and said positive lens and which shifts the front nodal point of the lens system further out than the front nodal point of the positive lens without changing the rear nodal point of the lens system as compared with the rear nodal point of said positive lens.

6. In a motion picture apparatus, the combination with film feeding mechanism and a rotatable plano-parallel rectifying member synchronized with the movement of film by said feeding mechanism and having at least two parallel surfaces, of a lens system disposed between the plane of a film translated by said mechanism and said member, said lens system comprising a positive lens having an object focal plane substantially coincident with said film plane and a conjugate focal plane in which rays converged by said lens form image points from object points on said film, and a negative lens positioned between said film plane and positive lens and increasing the relative opening of the lens combination as compared with the collective lens alone and shifting the rear nodal point of the lens combination toward said film as compared with the rear nodal point of the positive lens alone.

LODEWYK J. R. HOLST.
WILLIAM MAYER.
HARRY RAY MENEFEE.